US009007960B2

(12) United States Patent
Narasimha et al.

(10) Patent No.: US 9,007,960 B2
(45) Date of Patent: Apr. 14, 2015

(54) METHOD FOR CONTENTION BASED RANDOM ACCESS ON A SECONDARY CARRIER

(71) Applicant: Motorola Mobility LLC, Libertyville, IL (US)

(72) Inventors: Murali Narasimha, Lake Zurich, IL (US); Ajit Nimbalker, Buffalo Grove, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 99 days.

(21) Appl. No.: 13/626,024

(22) Filed: Sep. 25, 2012

(65) Prior Publication Data
US 2013/0083695 A1 Apr. 4, 2013

Related U.S. Application Data

(60) Provisional application No. 61/543,135, filed on Oct. 4, 2011.

(51) Int. Cl.
H04L 12/28 (2006.01)
H04W 74/08 (2009.01)
H04W 56/00 (2009.01)

(52) U.S. Cl.
CPC ........ *H04W 74/0841* (2013.01); *H04W 56/005* (2013.01); *H04W 56/0045* (2013.01)

(58) Field of Classification Search
CPC ....... H04L 41/12; H04L 45/02; H04W 72/04; H04W 88/08; H04W 80/04; H04W 84/12

USPC ........ 370/254, 329, 328, 474, 331, 232, 355, 370/341, 342, 345, 349, 236, 338, 348; 455/511, 450, 435.1, 403
See application file for complete search history.

(56) References Cited

U.S. PATENT DOCUMENTS

| | | | | |
|---|---|---|---|---|
| 8,428,013 | B2 * | 4/2013 | Lee et al. | 370/329 |
| 8,630,653 | B2 * | 1/2014 | Ahn et al. | 455/450 |
| 2008/0267161 | A1 * | 10/2008 | Bertrand et al. | 370/347 |
| 2010/0002590 | A1 | 1/2010 | Park et al. | |

(Continued)

OTHER PUBLICATIONS

Motorola Mobility: "RA Response transmission for SCell RACH procedure", 3GPP Draft; R2-115369-SCell RACH, 3rd Generation Partnershi P Project (3GPP), Mobile Competence Centre, 650, Route Des Lucioles, F-86921 Sophia-Antipolis Cedex , France, vol. RAN WG2, No. Zhuhai; 28111818, Oct. 4, 2811, all pages.

(Continued)

*Primary Examiner* — Chi H Pham
*Assistant Examiner* — Alexander O Boakye
(74) *Attorney, Agent, or Firm* — Faegre Baker Daniels LLP

(57) ABSTRACT

A mobile station performs random access method. The method includes receiving, from a first cell, a message identifying a random access preamble to transmit to a second cell, wherein the first and second cell operate on different frequencies. The method also includes determining whether the random access preamble is from a set of contention based random access preambles. In addition, the method includes receiving a random access response message, wherein the random access response message is addressed to a unique identifier of the mobile station; and transmitting, if the identified random access preamble is from the set of contention based preambles, a timing verification message.

14 Claims, 11 Drawing Sheets

(56) References Cited

U.S. PATENT DOCUMENTS

| | | |
|---|---|---|
| 2010/0002630 A1 | 1/2010 | Park et al. |
| 2011/0103332 A1 | 5/2011 | Kuo |
| 2011/0222492 A1* | 9/2011 | Borsella et al. .......... 370/329 |
| 2011/0249635 A1 | 10/2011 | Chen et al. |
| 2012/0082107 A1 | 4/2012 | Ou et al. |
| 2013/0083747 A1 | 4/2013 | Narasimha et al. |

OTHER PUBLICATIONS

Potevio: "Consideration on contention based random access", 3GPP Draft; R2-114966 Consideration on Contention Based Random Access. 3rd Generation Partnership Project (3GPP). Mobile Competence Centre; 658. Route Des Lucioles ; F-86921 Sophia-Antipolis Cedex; France. vol. RAN WG2. No. Zhuhai; 20111018 Oct. 2, 2011.

ZTE: "RACH procedure for MTA", 3GPP Draft; R2-113785 RACH Procedure for MTA. 3rd Generation Partnership Project(3GPP). Mobile Competence Centre; 658. Route Des Lucioles ; F-86921 Sophia-Antipolis Cedex ; France. vol. RAN WG2. No. Athens. Greece; 20110816. Aug. 16, 2011, all pages.

Mediatek: "Scell RACH Procedure", 3GPP Draft; R2-184198 Disc SCell PRACH V3. 3rd Generation Partnership Project (3GPP). Mobile Competence Centre; 658. Route Des Lucioles ; F-86921 Sophia-Antipolis Cedex; France. vol. RAN WG2. No. Athens. Greece; 20110816. Aug. 16, 2011, all pages.

Sharp: "Considerations for Contention based RACH on SCell", 3GPP Draft; R2-113955 Considerations for Contention Based RACH on SCell. 3rd Generation Partnership Project (3GPP). Mobile Competence Centre; 658. Route Des Lucioles ; F-86921 Sophia-Antipolis Cedex; France. vol. RAN WG2. No. Athens. Greece; 20110816. Aug. 16, 2811.

Patent Cooperation Treaty, International Search Report and Written Opinion of the International Searching Authority for International Application No. PCT/US2012/058228, Dec. 11, 2012, 12 pages.

ITRI: "Considerations on the remaining issues of Random Access on SCell", 3GPP Draft; R2-114213 Considerations on the Remaining Issues of Random Access on SCell V6, 3rd Generation Partnership Project (3GPP), Mobile Competence Centre; 658, Route Des Lucioles ; F-06921 Sophia-Antipolis Cedex ; France, vol. RAN WG2, No. Athens, Greece; 20110822, Aug. 16, 2011, all pages.

Research in Motion et al: "Random Access Response in multiple TA", 3GPP Draft; R2-114591, 3rd Generation Partnership Project (3GPP), Mobile Competence Centre ; 658, Route Des Lucioles ; F-86921 Sophia-Antipolis Cedex; France, vol. RAN WG2, No. Athens, Greece; 20110822, Aug. 24, 2011, all pages.

"3rd Generation Partnership Project; Technical Specification Group Radio AccessNetwork; Evolved Universal Terrestrial Radio Access (E-UTRA); Medium Access Control (MAC) protocol specification(Release 18)", 3GPP Standard; 3GPP TS 36.321, 3rd Generation Partnership Project (3GPP), Mobile Competence Centre; 658, Route Des Lucioles ; F-86921 Sophia-Antipolis Cedex; France, vol. RAN WG2, No. VI0.3.8, Sep. 20, 2011, pp. 1-54.

Huawei et al: "Location of Msg2 for RACH on SCell", 3GPP Draft; R2-113995 Location of MSG2 for RACH on SCell, 3rd Generation Partnership Project (3GPP), Mobile Competence Centre; 658, Route Des Lucioles ; F-06921 Sophia-Antipolis Cedex ; France, vol. RAN WG2, No. Athens, Greece; 20110822, Aug. 16, 2011, all pages.

Patent Cooperation Treaty, International Search Report and Written Opinion of the International Searching Authority for International Application No. PCT/US2012/058230, Dec. 11, 2012, 13 pages.

3GPP TSG-RAN2 Meeting #79, R2-124361, QuingDao, China, Aug. 13-17, 2012, Change Request, 36.321 CR 0572, rev 1, current version: 10.5.0; "Introduction of CA Enhancements in MAC" Ericsson, 14 pages.

United States Patent and Trademark Office, "Non-Final Rejection" for U.S. Appl. No. 13/626,106 dated May 22, 2014, 8 pages.

* cited by examiner

US 9,007,960 B2

METHOD FOR CONTENTION BASED RANDOM ACCESS ON A SECONDARY CARRIER

CROSS-REFERENCE TO RELATED APPLICATIONS

The present application claims benefits under 35 U.S.C. 119 to U.S. provisional Application No. 61/543,135 filed on 4 Oct. 2011, the contents of which are incorporated herein by reference.

FIELD OF THE INVENTION

The present invention relates generally to communication systems and in particular, to random access when multiple timing advances are used.

BACKGROUND

Carrier Aggregation will be used in future LTE networks to provide improved data rates to users. Carrier aggregation consists of transmitting data to or receiving data from the UE on multiple carrier frequencies ("component carriers"). The wider bandwidth enables higher data rates.

A UE can be configured with a set of component carrier (CCs). Specifically, the UE is configured with a cell on each component carrier. Some of these cells may be activated. The activated cells can be used to send and receive data (i.e., the activated cells can be used for scheduling). The UE has up to date system information for all configured cells. Therefore, after a cell has been configured, it can be quickly activated. Thus, when there is a need for aggregating multiple CCs (e.g., a large burst of data), the network can activate configured cells on one or more of the CCs. There is a designated primary serving cell (Pcell) on a CC that is referred to as the primary CC, which is always activated. The other configured cells are referred to as secondary serving cells (Scells), and the corresponding CCs are referred to as secondary CCs.

Remote Radio Heads (RRHs) are used to extend coverage of a base station. As part of the work on carrier aggregation, next-generation cellular communication systems will support carrier aggregation of frequencies on which RRHs are deployed. Carrier Aggregation will be used to provide improved data rates to users. Carrier aggregation consists of transmitting data to or receiving data from the user equipment (UE) on multiple carrier frequencies ("component carriers"). The wider bandwidth enables higher data rates.

RRHs are deployed on a different frequency than the frequency used by the base station site and provide hot-spot like coverage on that frequency. User equipment (UE) that is in such a hot-spot can perform carrier aggregation of the frequency used by the base station and the frequency used by the RRH and obtain corresponding throughput benefits. RRHs do not embody typical base station functionalities such as higher layer processing, scheduling etc. The baseband signal transmitted by an RRH is generated by the base station and is carried to the RRH by a high speed wired (e.g., optical) link. Thus RRHs function as remote antenna units of a base station, with a high speed link to the base station.

A base station 101, RRH 102, and UE 103 are shown in FIG. 1. As is evident, a non-wireless link 104 exists between base station 101 and RRH 102. The transmissions to UE 102 occur both from base station 101 and from RRH 102, except that the transmissions from base station 101 exist on a different frequency than the transmissions from RRH 102.

The presence of RRHs introduces additional physical locations from which the UE can receive the base station signal (i.e., in addition to receiving the base station signal directly from the base station). In addition, there is a delay introduced by the communication between the base station and the RRH. This delay results in the UE perceiving very different propagation delays on the frequency used by the base station and the frequency used by the RRH. As a consequence, the timing advance applied to the two frequencies need to be different.

FIG. 2 shows the timing relationships between downlink and uplink transmissions of the two frequencies. In particular, downlink (DL) transmission (Tx) is shown on frequency 1 (F1) as subframe 201, DL reception (Rx) is shown on F1 as subframe 202, UL Tx is shown on F1 as subframe 203, UL Rx is shown on F1 as subframe 204. In a similar manner DL Tx is shown on F2 as subframe 205, DL Rx is shown on F2 as subframe 206, UL Tx is shown on F2 as subframe 207, and UL Rx is shown on F2 as subframe 208.

It is assumed that base station 101 tries to ensure that uplink transmissions on F1 and F2 are received at the same time. Transmissions on F2 through RRH 102 (both uplink and downlink) have an additional delay due to transmission through fiber link 104 and the associated RRH processing. This additional delay can be as large as 30 microseconds. As shown in FIG. 2, in order for the F2 uplink to arrive at the base station at the same time as the F1 uplink, the timing advance applied by the UE for transmissions on F2 has to compensate for the fiber and RRH processing delay.

As a result, the uplink subframes 203, 204, 207, and 208 on F1 and F2 are not time aligned. In FIG. 2, F2 uplink subframe 207 starts before F1 uplink subframe 203.

There may also be a need for a different frame timing when the two carriers are on different bands with a large frequency separation, even without deployment of RRHs. In such cases the UE has to maintain a separate timing advance for the second carrier.

In order to obtain a timing advance for the primary carrier, the UE has to perform a random access procedure on the primary carrier. The UE transmits a random access preamble to the eNB on the primary uplink carrier frequency. The eNB calculates the appropriate timing advance the UE should apply based on the timing of the received random access preamble. The eNB transmits a Random access response message (RAR) in response to a RACH preamble transmission by the UE, on the primary downlink carrier frequency. The RAR includes the timing advance calculated by the eNB from the RACH transmission.

In order to maintain uplink timing on a secondary carrier, the UE has to perform a random access preamble transmission on the secondary carrier. Transmitting the RAR message on the downlink of the secondary carrier is a possibility. However, such a mechanism is inadequate, as discussed below.

Support of Heterogeneous Network Scenarios:

If an LTE UE is experiencing control channel interference on the SCell (for example, due to presence of interfering pico cells on the secondary CC), then the UE is unable to receive PDCCH transmission from the eNB on the SCell. Receiving the RAR message requires the UE to be able to receive the PDCCH for the RAR message, which the UE is unable to do in this case. In such a case, the eNB configures "cross carrier scheduling" for the SCell: the PDCCH for the SCell is transmitted on a different cell (e.g., PCell). This enables the eNB to use the SCell for PDSCH transmissions. However, since there isn't a mechanism to resynchronize uplink timing, the UE will be unable to use the SCell uplink.

Additional PDCCH Blind Decodes:

In LTE, the downlink control information is transmitted via the Physical Downlink Control channels (PDCCH). The PDCCH typically contains control information about the downlink control information (DCI) formats or scheduling messages, which inform the UE of the modulation and coding scheme, transport block size and location, precoding information, hybrid-ARQ information, UE Identifier, Carrier Indicator Function, CSI request fields, SRS request field, etc. that is required to decode the downlink data transmissions or for transmitting on the uplink. This control information is protected by channel coding (typically, a cyclic-redundancy check (CRC) code for error detection and convolutional encoding for error correction) and the resulting encoded bits are mapped on the time-frequency resources. For example, in LTE Rel-8, these time-frequency resources occupy the first several OFDM symbols in a sub-frame. A group of four Resource Elements is termed as a Resource Element Group (REG). Nine REGs comprise a Control Channel Element (CCE). The encoded bits are typically mapped onto either 1 CCE, 2 CCEs, 4 CCEs or 8 CCEs. These four are typically referred to as aggregation levels 1, 2, 4 and 8. The UE searches the different hypotheses (i.e., hypotheses on the aggregation level, DCI Format size, etc) by attempting to decode the transmission based on allowable configurations. This processing is referred to as blind decoding.

To limit the number of configurations required for blind decoding, the number of hypotheses is limited. For example, the UE does blind decoding using the starting CCE locations as those allowed for the particular UE. This is done by the so-called UE-specific search space (UESS), which is a search space defined for the particular UE (typically configured during initial setup of a radio link and also modified using RRC message). Similarly a common search space (CSS) is also defined that is valid for all UEs and might be used to schedule broadcast downlink information like Paging, or Random access response, or other purposes. The number of blind decoding attempts that a UE performs is limited (e.g. 44 in Rel-8 LTE (12 in CSS and 32 in UESS), and up to 60 for Pcell (12 in CSS, and 48 in UESS) and up to 48 for Scell (48 in UESS) in Rel-10) for several reasons.

Other than reducing the computational load (i.e. convolutional decoding attempts), limiting the number of blind decodes also help in reducing CRC falsing rate. A CRC falsing occurs when the UE decodes an incorrect transmission and treats it as a valid PDCCH because the CRC passes and this can lead to protocol errors or other errors resulting in system performance loss. Therefore, it is desirable to keep the falsing rates very low. Typically, for a k-bit CRC attached, if n is the number of decoding attempts, the probability of CRC falsing (i.e. false positive) is approximately $n \times 2^{-k}$.

For carrier aggregation operation in LTE, the system information is typically transmitted via the Pcell and hence the UE monitors the CSS and UESS for the Pcell. The Scell system information is transmitted via RRC signaling (on a UE specific basis) and this can be transmitted via the Pcell and there is no need for the UE to monitor the CSS on the Scells. Thus, the CSS corresponding to the SCell are not monitored and the UE benefits from having to perform smaller number of blind decodes for the Scells. The RAR is transmitted using an RA-RNTI (i.e., the PDCCH for the RAR is scrambled using an RA-RNTI). RA-RNTI is a broadcast identifier and reception of the PDCCH for RAR requires monitoring of the common search space on the SCell DL. As described above, monitoring the common search space on the SCell DL requires additional blind decodes, which increases the complexity of the UE. Therefore a procedure to acquire SCell UL timing without requiring monitoring the PDCCH common search space on the SCell is needed.

There are two types of random access procedures—contention based random access (CBRA) and contention free random access (CFRA). In the contention based random access procedure, the UE selects a random access preamble and contention resolution is performed. The CBRA procedure is illustrated in FIG. 4. UE (401) transmits a random access preamble (411) to the eNB (402). The eNB computes the timing advance of the UE and transmits a Random access response (RAR) message (412). The RAR message includes the timing advance computed by the eNB and an uplink resource allocation (uplink grant). The UE transmits a contention resolution message (413) using the uplink resources granted in the RAR message. The eNB responds with a contention resolution message (414) which indicates whether contention resolution is successful. It is possible that two UEs select the same random access preamble and transmit the random access preamble at the same time. In this case, both UEs attempt to transmit their respective contention resolution messages (413) using the uplink grant. The contention resolution message (413) includes a unique identifier of the UE. If the eNB is able to decode both the contention resolution messages, it can select one of the two UEs as the winner of the contention resolution and transmit the contention resolution message (414) indicating the winner of the contention resolution. The other UE can reattempt the random access procedure.

The CFRA procedure is illustrated in FIG. 5. The eNB (502) transmits an RA preamble assignment message (510) to the UE (501). The RA preamble assignment message assigns a random access preamble to the UE. The UE transmits the assigned random access preamble (511) to the eNB. The eNB computes the timing advance of the UE and transmits a Random access response (RAR) message (512). The RAR message includes the timing advance computed by the eNB. Given that the eNB assigns the preamble to the UE, the eNB can ensure that there is a single UE using the preamble at a given time. Consequently, there is no need for contention resolution in the CFRA procedure.

Contention free random access (CFRA) requires the eNB to reserve more preambles to support the additional RACH transmissions for Scell RACH when UEs capable of uplink aggregation are present (in addition to RACH transmissions for handover, DL data arrival). In general, CFRA is helpful when it is important for the RACH procedure to complete quickly. For SCell RACH, quick completion is not as critical. Not having to reserve RACH preambles is a more critical requirement.

Thus there is a need to support contention based random access to obtain uplink timing on SCells, while also overcoming the deficiencies related to receiving the RAR message on the same cell on which the RACH preamble is transmitted.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In order to meet the above-mentioned need, a method to perform a contention based random access procedure on an SCell is provided. The method enables the UE to obtain a timing advance for an SCell without having to receive the control channel for the RAR message on the SCell. Furthermore, it eliminates the need to reserve contention free preambles, by the eNB, for SCell random access.

Figure 1:
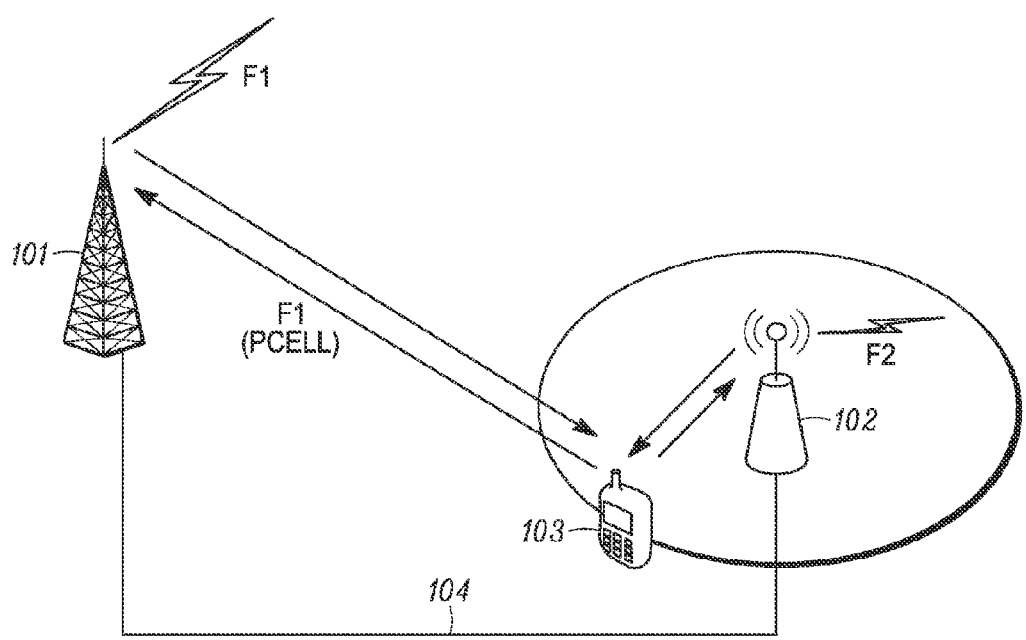
FIG. 1 shows a communication system employing a remote radio head.
Figure 2:
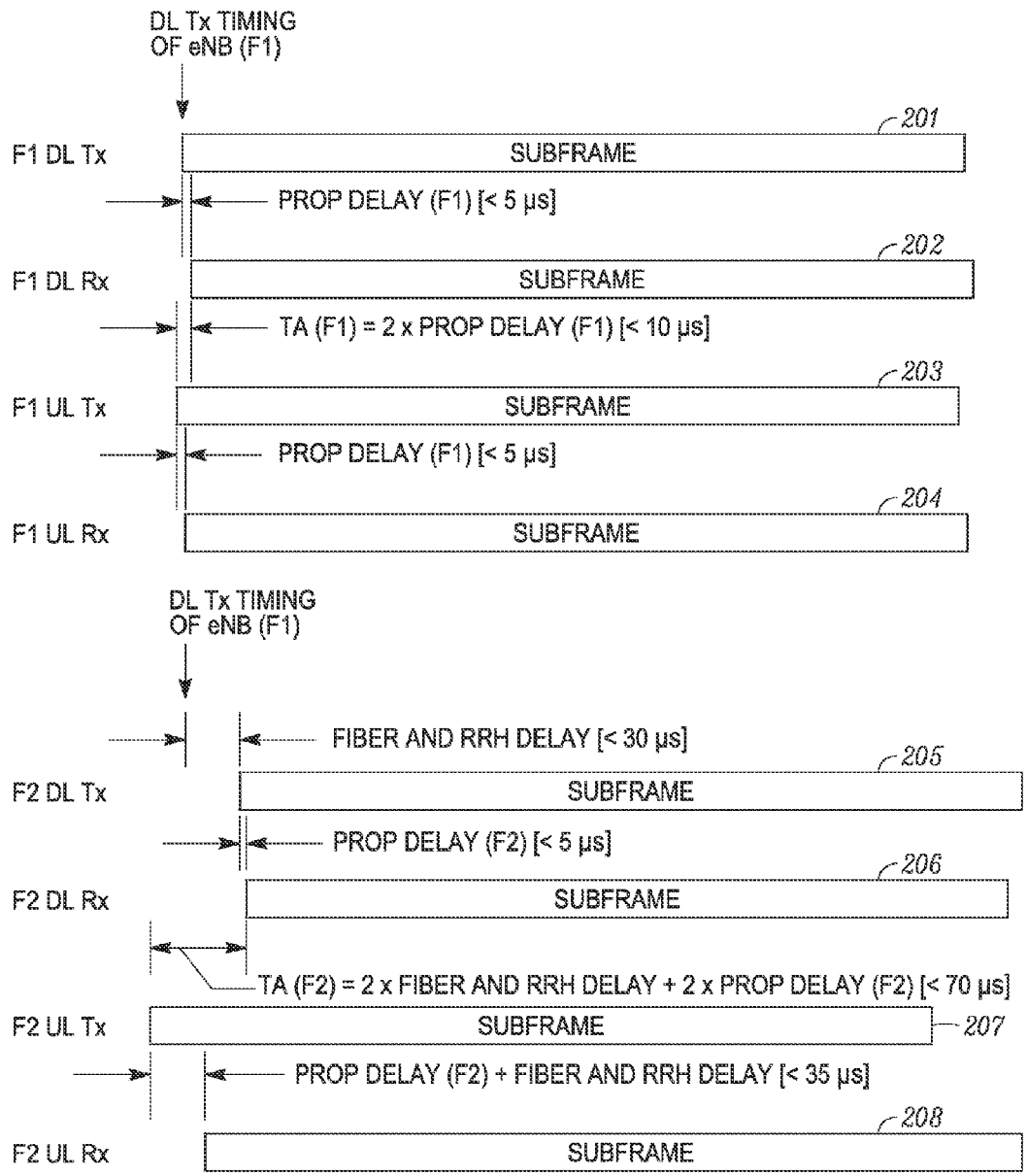
FIG. 2 illustrates timing of uplink and downlink transmissions.
Figure 3:
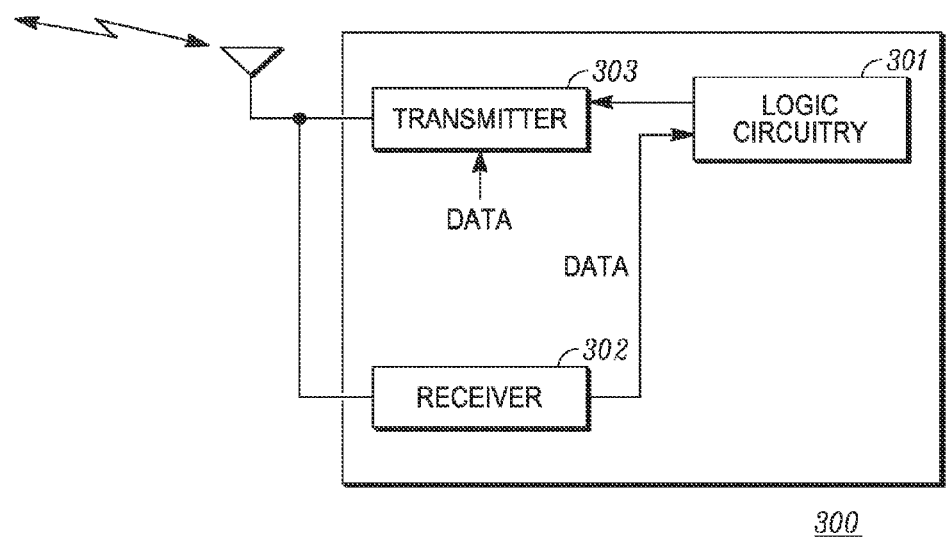
FIG. 3 is a block diagram showing a mobile unit.
Figure 4:
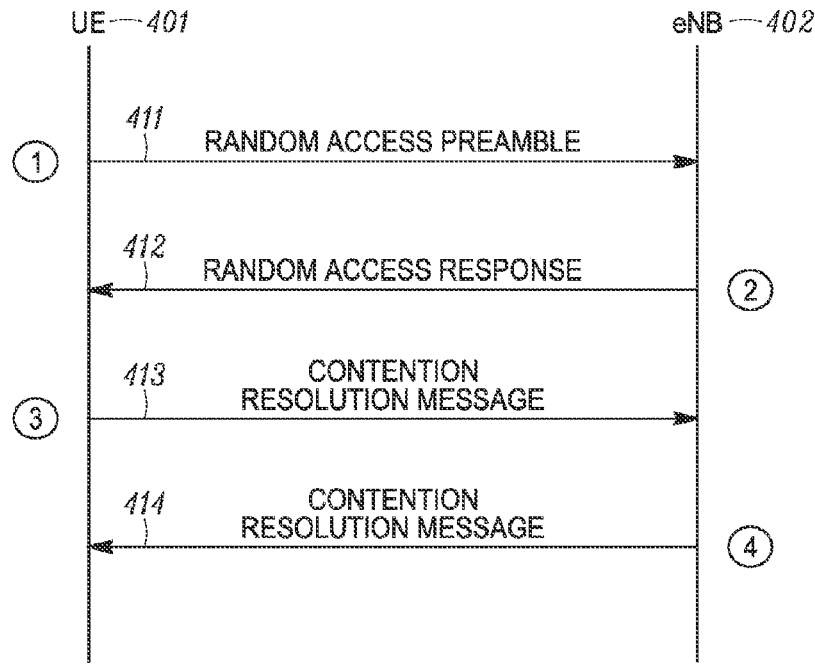
FIG. 4 illustrates a contention based random access procedure.
Figure 5:
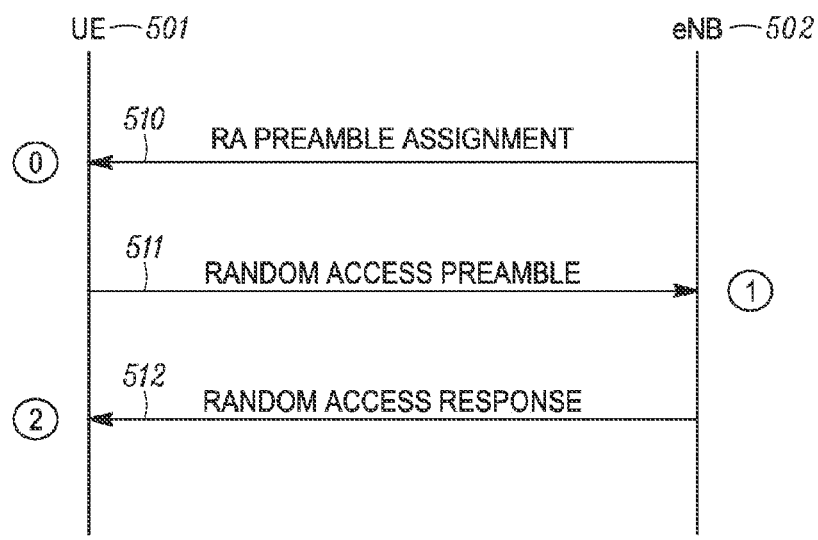
FIG. 5 illustrates a contention free random access procedure.

Turning now to the drawings, where like numerals designate like components, FIG. 3 is a block diagram showing user equipment 300. As shown, user equipment 300 comprises logic circuitry 301, receive circuitry 302, and transmit circuitry 303. Logic circuitry 101 comprises a digital signal processor (DSP), general purpose microprocessor, a programmable logic device, or application specific integrated circuit (ASIC) and is utilized to accesses and control transmitter 303 and receiver 302. Receive and transmit circuitry 302-303 are common circuitry known in the art for communication utilizing a well known communication protocol, and serve as means for transmitting and receiving messages.

User equipment 300 may aggregate carriers as described above. More particularly, UE 300 supports carrier aggregation of frequencies on which RRHs are deployed. Thus, UE 300 will have the capabilities to communicate simultaneously over various frequencies to base station 101.

Figure 6:
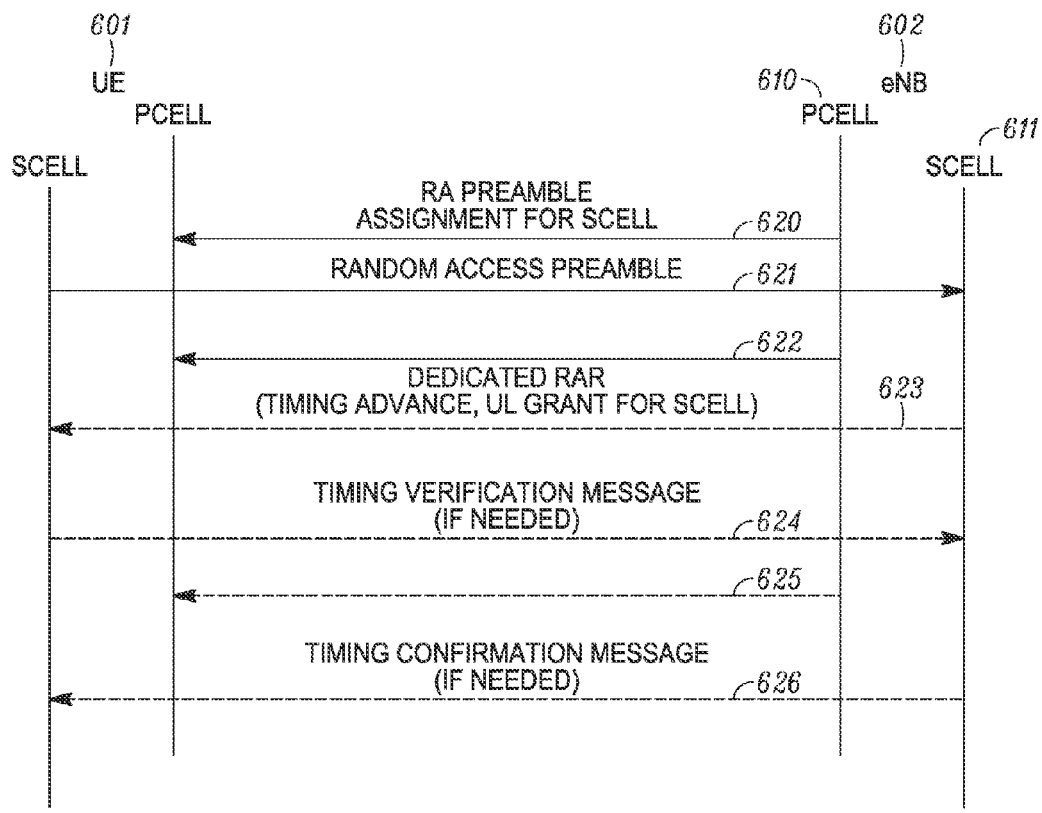
FIG. 6 illustrates an embodiment of the invention.

An embodiment of the invention is illustrated in FIG. 6. A UE (601) is configured to operate on a PCell (610) on a primary frequency of an eNB (602) and on an SCell on a secondary frequency (611) of the eNB (602). The eNB determines a need for the UE to perform a random access procedure on the SCell (611). The eNB transmits an RA preamble assignment message for the SCell (620) to the UE. The RA preamble assignment message indicates a random access preamble that the UE is required to transmit to the SCell. The UE transmits the random access preamble indicated in 620 to the SCell (621). The eNB detects the random access preamble transmission and computes the timing advance for the UE for operation on the SCell. The eNB then transmits a Dedicated RAR message (622) to the UE. The Dedicated RAR message includes the timing advance calculated by the eNB and can include an UL grant for a transmission by the UE to the SCell (611). The Dedicated RAR message is transmitted using a unique identifier of the UE. For example, the dedicated RAR message can have a control channel that is scrambled using the C-RNTI of the UE. Thus, the dedicated RAR message (622) is only received by the UE (601) for which it is intended. The UE (601) applies the timing advance indicated in the RAR message.

The UE determines whether the random access preamble assigned at 620 is a CBRA preamble or a CFRA preamble. If the preamble is a CBRA preamble, the UE transmits a timing verification message (624) to the SCell (611) using the UL grant included in the dedicated RAR message. If the timing advance applied by the UE is correct and if the timing verification message is received by the eNB, the eNB transmits a timing confirmation message (625). If the preamble is a CFRA preamble, the steps 624 and 625 may not be needed.

According to another embodiment, the SCell (611) may be configured for cross carrier scheduling for the UE (601). That is, control channels for data transmissions on the SCell (611) for the UE are transmitted on a cell other than the SCell (611). For example, the physical downlink control channel (PDCCH) for the SCell may be transmitted and received on the PCell. Specifically, the dedicated RAR message (622) transmission can be such that the PDCCH for the dedicated RAR message is transmitted and received on the PCell and the physical downlink shared channel (PDSCH) portion of the dedicated RAR message is transmitted and received on the SCell. Consequently, the UE is able to receive an RAR message on a different configured cell than the one on which the random access preamble transmission was performed.

Figure 7:
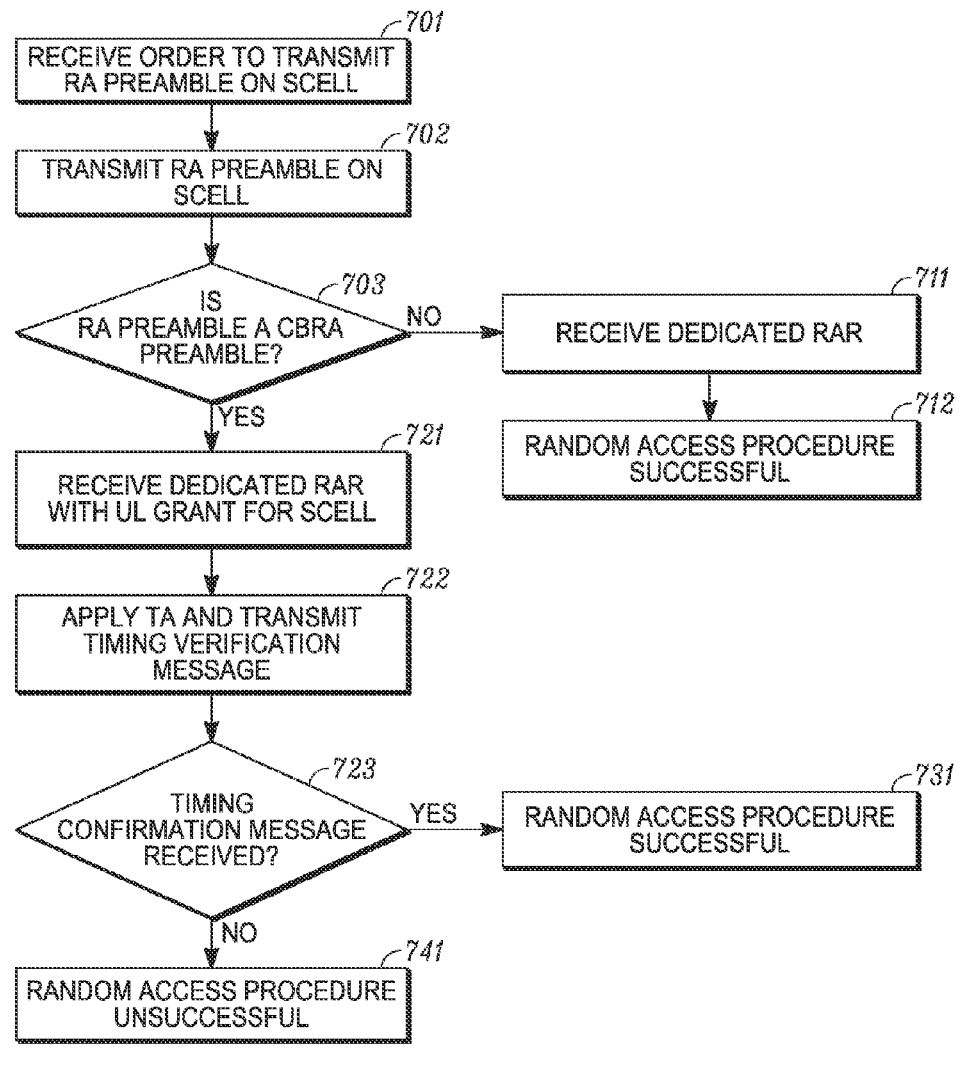
FIG. 7 illustrates a procedure at a mobile station according to an embodiment of the invention.

FIG. 7 illustrates a procedure at the UE, according to a further embodiment. At 701 the UE receives an order to transmit a specific RA preamble on the SCell. Such an order can be a PDCCH order including an indication of the preamble to transmit and the cell on which to transmit the preamble. The UE transmits the RA preamble on the SCell at 702. At 703 the UE determines whether the RA preamble is a CFRA preamble or a CBRA preamble. The UE can determine whether the RA preamble is a CFRA preamble or a CBRA preamble by acquiring the system information of the SCell. The system information of the SCell can indicate which preambles are CBRA preambles and which preambles are CFRA preambles. Alternatively, the eNB can indicate whether the RA preamble is a CBRA preamble or a CFRA preamble. For example, the eNB can include in the PDCCH order at 701 an indication that the preamble is CBRA or CFRA preamble.

If the RA preamble is a CFRA preamble, the UE receives a dedicated RAR message at 711. The dedicated RAR message includes timing advance information. The UE applies the timing advance. The dedicated RAR message is addressed to a unique identifier of the UE, such as the UE's C-RNTI. At 712, the procedure is considered successful.

If the RA preamble is a CBRA preamble, the UE receives a dedicated RAR message at 721. The dedicated RAR message includes timing advance information and an uplink grant for the SCell. The dedicated RAR message is addressed to a unique identifier of the UE, such as the UE's C-RNTI. The UE applies the timing advance. At 722, the UE transmits a timing verification message. The timing verification message is transmitted using the uplink resources of the SCell indicated in the dedicated RAR message. The timing verification message may include an identifier of the UE. Alternatively, the timing verification message may be a message carrying user data or data from upper layers. The timing verification message may also be a message with predefined content.

At 723 the UE determines whether a timing confirmation message is received. The timing confirmation may be a message addressed to a unique identifier of the UE. Alternatively, the timing confirmation message may be an acknowledgement to the timing verification message transmitted at 722. For example, the timing confirmation message may be a physical layer acknowledgement to the timing verification message. If a timing confirmation message is received, the procedure ends successfully at 731. If a timing confirmation message is not received, the procedure is unsuccessful at 741. If the procedure is unsuccessful at 741, the UE stops using the timing advance received at 721.

Alternatively, the UE may receive a timing verification failure message, in which case the procedure is unsuccessful. Consequently, the UE stops using the timing advance received at 721.

Figure 8:
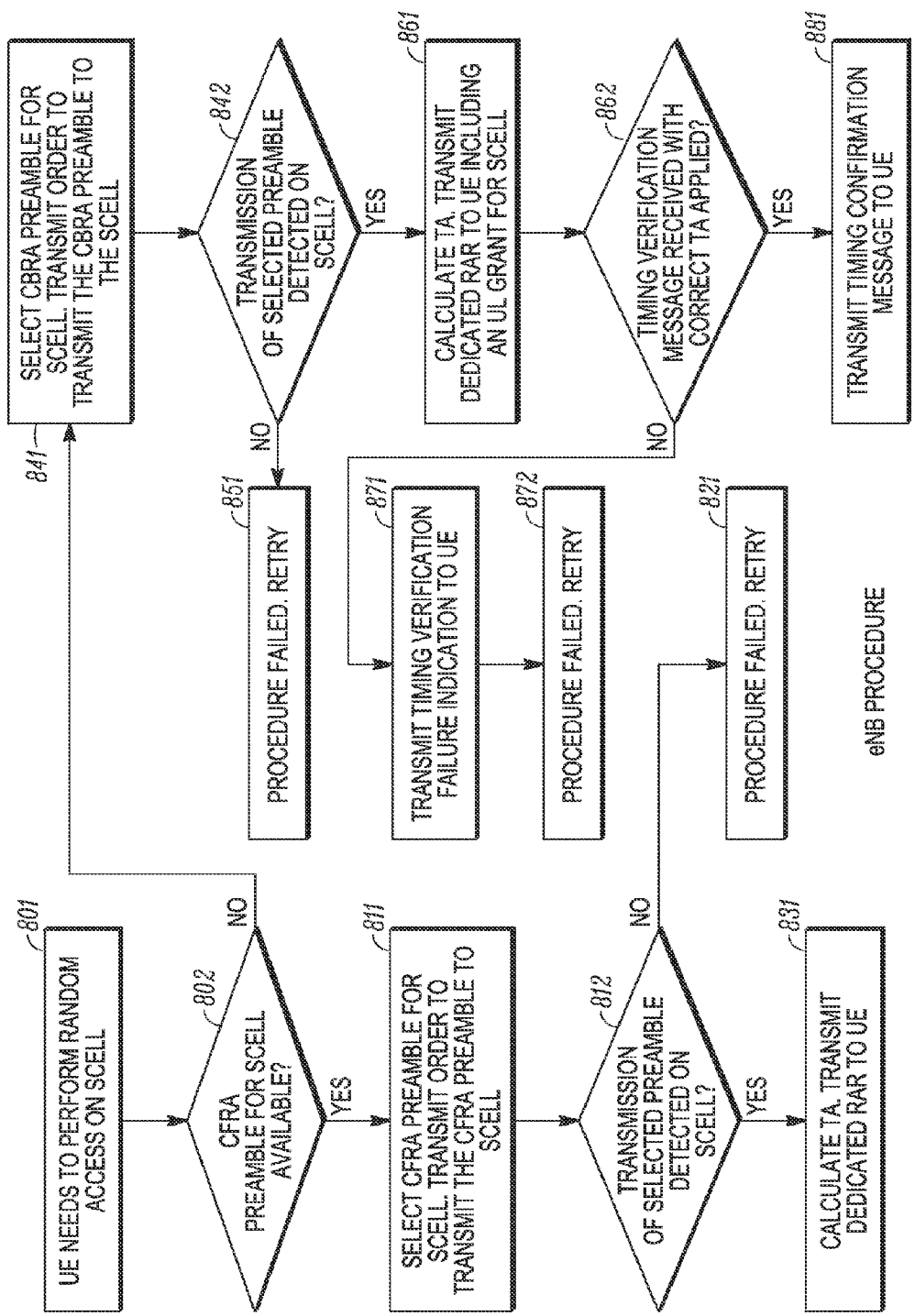
FIG. 8 illustrates a procedure at a base station according to an embodiment of the invention.

FIG. 8 illustrates an eNB procedure, according to another embodiment. At 801, the eNB determines a need for the UE to perform random access on the SCell. At 802, the eNB determines whether a CFRA preamble for the SCell is available. If a CFRA preamble for the SCell is available, the eNB selects the CFRA preamble. At 811 the eNB transmits an order to the UE to transmit the selected CFRA preamble to the SCell. At 812, the eNB determines whether a transmission of the selected preamble is detected. If a transmission of the selected preamble is detected, the eNB calculates a timing advance based on the received preamble transmission, and at 831 transmits a dedicated RAR message to the UE. The dedicated RAR message includes the timing advance calculated by the eNB.

If a transmission of the selected preamble is not detected, the procedure fails at 821. The eNB can reattempt the procedure.

At 802, if a CFRA preamble for the SCell is not available, the eNB selects a CBRA preamble for the SCell. At 841 the eNB transmits an order to the UE to transmit the selected CBRA preamble to the SCell. At 842 the eNB determines whether a transmission of the selected preamble is detected. If a transmission of the selected preamble is detected, the eNB calculates a timing advance based on the received preamble transmission, and at 861 transmits a dedicated RAR message to the UE. The dedicated RAR message includes the timing advance calculated by the eNB and an uplink grant for the SCell.

At 862 the eNB determines whether a timing verification message is received on the SCell. The eNB further determines whether the timing verification message uses a correct timing advance. The eNB may determine that the timing advance used for the timing verification message is correct based on determining that the transmission of the timing verification message does not cause significant interference to other uplink transmissions on the SCell. The eNB may further verify that the timing verification message is transmitted using uplink resources signaled in the uplink grant at 861. If a timing verification message that uses a correct timing advance and uplink resources is received, the eNB at 881 transmits a timing confirmation message to the UE. The timing confirmation may be a message addressed to a unique identifier of the UE. Alternatively, the timing confirmation message may be an acknowledgement to the timing verification message transmitted at 822. For example, the timing confirmation message may be a physical layer acknowledgement to the timing verification message.

If, at 862, the eNB determines that a timing verification message that uses a correct timing advance and uplink resources is not received, it may transmit a timing advance failure indication to the UE. Alternatively, the eNB may not transmit any message to the UE to indicate that a timing verification message that uses a correct timing advance and uplink resources is not received. Consequently, the procedure fails at 872. The eNB can reattempt the procedure.

Figure 9:
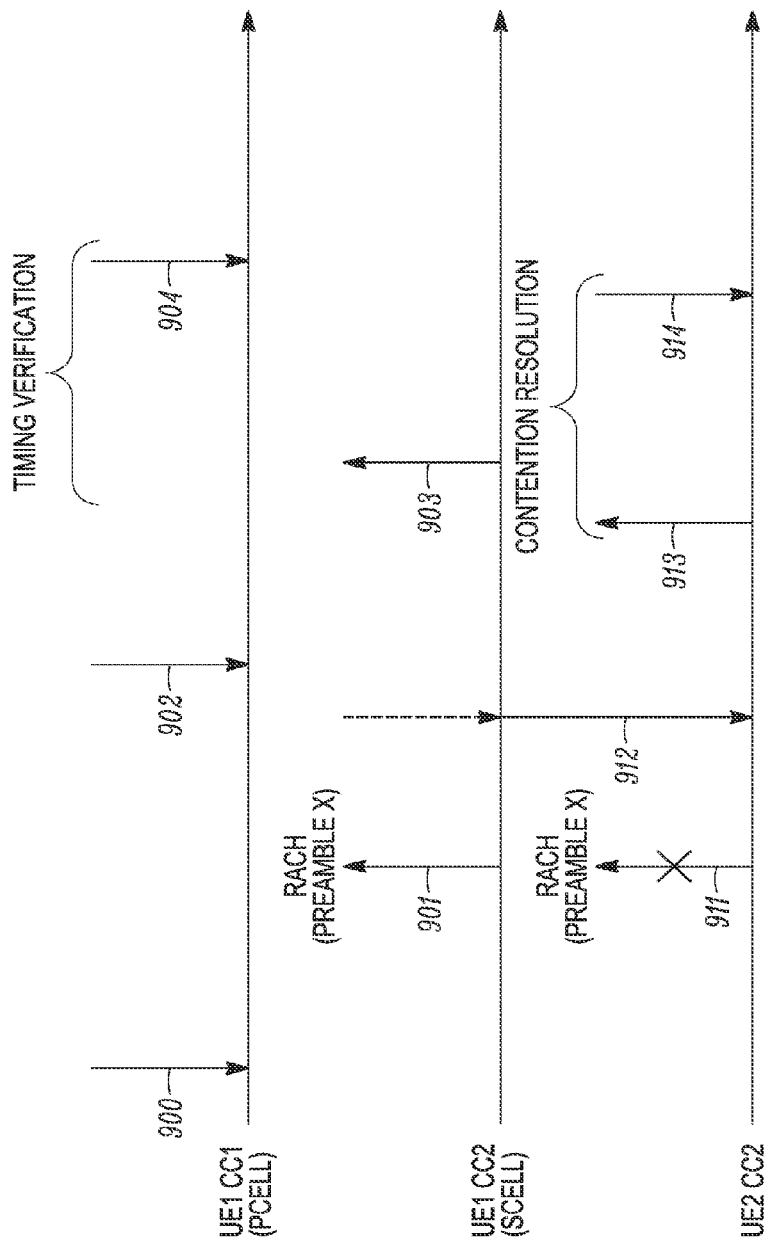
FIG. 9 illustrates an operation of the invention.
Figure 10:
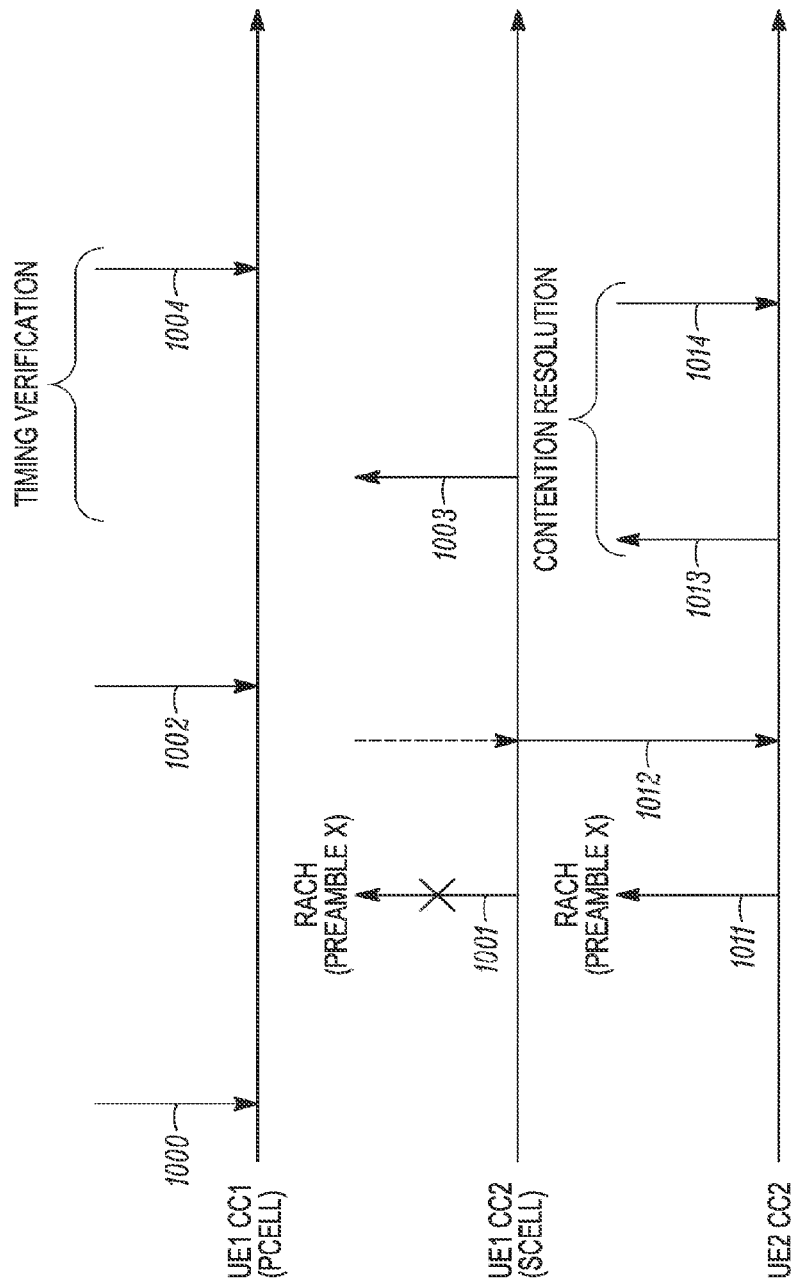
FIG. 10 illustrates an operation of the invention.

An operation of the invention is illustrated in FIG. 9 and FIG. 10. UE1 is configured with a PCell operating on a frequency CC1 and a SCell operating on a frequency CC2. The timing advance required the uplink operation on PCell and the SCell are substantially different. UE1 is further configured for cross carrier scheduling on the SCell. The control channel for data transmissions on the SCell are transmitted on the PCell. That is, UE1 monitors the downlink frequency of the PCell for (a) PDCCHs indicating PDSCH resource allocation on the downlink of the PCell, (b) PDCCHs indicating PUSCH resource allocation on the uplink of the PCell, and (c) PDCCHs indicating PDSCH resource allocation on the downlink of the SCell.

In order to transmit PUSCH on the uplink of the SCell, the UE needs to obtain a timing advance for the SCell. At 900 UE1 receives a PDCCH order ordering the UE to perform a random access preamble transmission on the SCell. The PDCCH order indicates the random access preamble X to transmit. Preamble X is a CBRA preamble of the SCell. At 901 UE1 transmits the indicated random access preamble on the SCell uplink. Another UE, UE2, may be operating on CC2. UE2 can choose the random access preamble X and perform the random access preamble transmission (911) at the same time as UE1's random access preamble transmission (901). Thus the eNB may receive two overlapping transmissions of the preamble X. Timing advance compensates for the propagation delay between a UE and the eNB and is calculated by the eNB based on the timing of the received preamble transmission. Therefore, it is important to use UE1's preamble transmission to determine the timing advance for UE1 and UE2's preamble transmission to determine timing advance for UE2. In a scenario where the eNB receives two UEs transmit the same preamble simultaneously, the timing advance calculated by the eNB may be correct only for one of the two UEs.

According to the scenario in FIG. 9, the transmission of preamble X by UE1 (901) is received by the eNB, but the transmission of preamble X (911) is not received by the eNB.

At 902, UE1 receives a dedicated RAR message. The dedicated RAR message has a PDCCH that is addressed to a unique identifier of UE1, such as UE1's C-RNTI. In normal operation, any UE other than UE1 is not expected to be able to receive and decode the PDCCH addressed to a unique identifier of UE1. The dedicated RAR message includes timing advance information and an uplink resource grant for the SCell. UE1 applies the timing advance signaled in the dedicated RAR message. At 903, UE1 transmits a timing verification message on the SCell according to the uplink resource grant in the dedicated RAR message. At 904, the UE receives a timing confirmation message, which successfully completes the random access procedure for UE1.

At the time of reception of the preamble (901, 911), the eNB cannot determine whether the preamble transmission is from UE1 or from a different UE. Therefore, optionally, the eNB may transmit an RAR message on the downlink of the SCell (912). The PDCCH of the RAR message 912 is addressed to a broadcast RNTI (such as a random access RNTI). The RAR message 912 can include timing advance information and an uplink grant. The timing advance value is computed based on the received preamble X at the eNB and is the same value included in the dedicated RAR message 902. The RAR message 912 may also indicate that it is a response to transmission of preamble X. UE2 may receive the RAR message 912 and apply the timing advance. UE2 may then transmit a contention resolution message 913. The contention resolution message can include a unique identifier of UE2. Given that the timing advance in RAR message is calculated based on UE1's transmission of preamble X, the eNB may not be able to receive and decode the contention resolution message. Consequently, UE2 may not receive a message indicating successful contention resolution and thus fail contention resolution. Alternatively, the eNB may receive and decode the contention resolution message and determine that the timing advance used by UE2 is incorrect. Consequently, UE2 may either not receive a message indicating successful contention resolution and thus fail contention resolution, or it may receive a message indicating contention resolution failure (914) and thus fail contention resolution.

FIG. 10 illustrates the scenario in which UE2's transmission of preamble X is received by the eNB and UE1's transmission of preamble X is not received by the eNB. UE1 is configured with a PCell operating on a frequency CC1 and a SCell operating on a frequency CC2. The timing advance required the uplink operation on PCell and the SCell are substantially different. UE1 is further configured for cross carrier scheduling on the SCell. The control channel for data transmissions on the SCell are transmitted on the PCell. At 1000 UE1 receives a PDCCH order ordering the UE to perform a random access preamble transmission on the SCell. The PDCCH order indicates the random access preamble X to transmit. Preamble X is a CBRA preamble of the SCell. At 1001 UE1 transmits the indicated random access preamble on the SCell uplink. Another UE, UE2, may be operating on CC2. UE2 can choose the random access preamble X and perform the random access preamble transmission (1011) at the same time as UE1's random access preamble transmission (1001). The transmission of preamble X by UE1 (1001) is not received by the eNB, but the transmission of preamble X (1011) is received by the eNB.

At 1002, UE1 receives a dedicated RAR message. The dedicated RAR message has a PDCCH that is addressed to a unique identifier of UE1, such as UE1's C-RNTI. In normal operation, any UE other than UE1 is not expected to be able to receive and decode the PDCCH addressed to a unique identifier of UE1. The dedicated RAR message includes timing advance information and an uplink resource grant for the SCell. UE1 applies the timing advance signaled in the dedicated RAR message. At 1003, UE1 transmits a timing verification message on the SCell according to the uplink resource grant in the dedicated RAR message. Given that the timing advance value is computed based on the preamble X transmission by UE2, the eNB may not be able to receive and decode the contention resolution message. Consequently, UE1 may not receive a message indicating successful timing verification and thus fail the random access procedure. Alternatively, the eNB may receive and decode the timing verification message and determine that the timing advance used by UE1 is incorrect. Consequently, UE1 may either not receive a message indicating successful timing verification and thus fail the random access procedure, or it may receive a message indicating timing verification failure (1004) and thus fail the random access procedure. UE1 then discontinues use of the timing advance indicated in the dedicated RAR message.

The eNB may optionally transmit an RAR message on the downlink of the SCell (1012). The PDCCH of the RAR message 1012 is addressed to a broadcast RNTI (such as a random access RNTI). The RAR message 1012 can include timing advance information and an uplink grant. The timing advance value is computed based on the received preamble X at the eNB and is the same value included in the dedicated RAR message 1002. The RAR message 1012 may also indicate that it is a response to transmission of preamble X. UE2 may receive the RAR message 1012 and apply the timing advance. UE2 may then transmit a contention resolution message 1013. The contention resolution message can include a unique identifier of UE2. The eNB transmits to UE2 a message indicating successful contention resolution (1014). Consequently, UE2 successfully completes its random access procedure.

Figure 11:
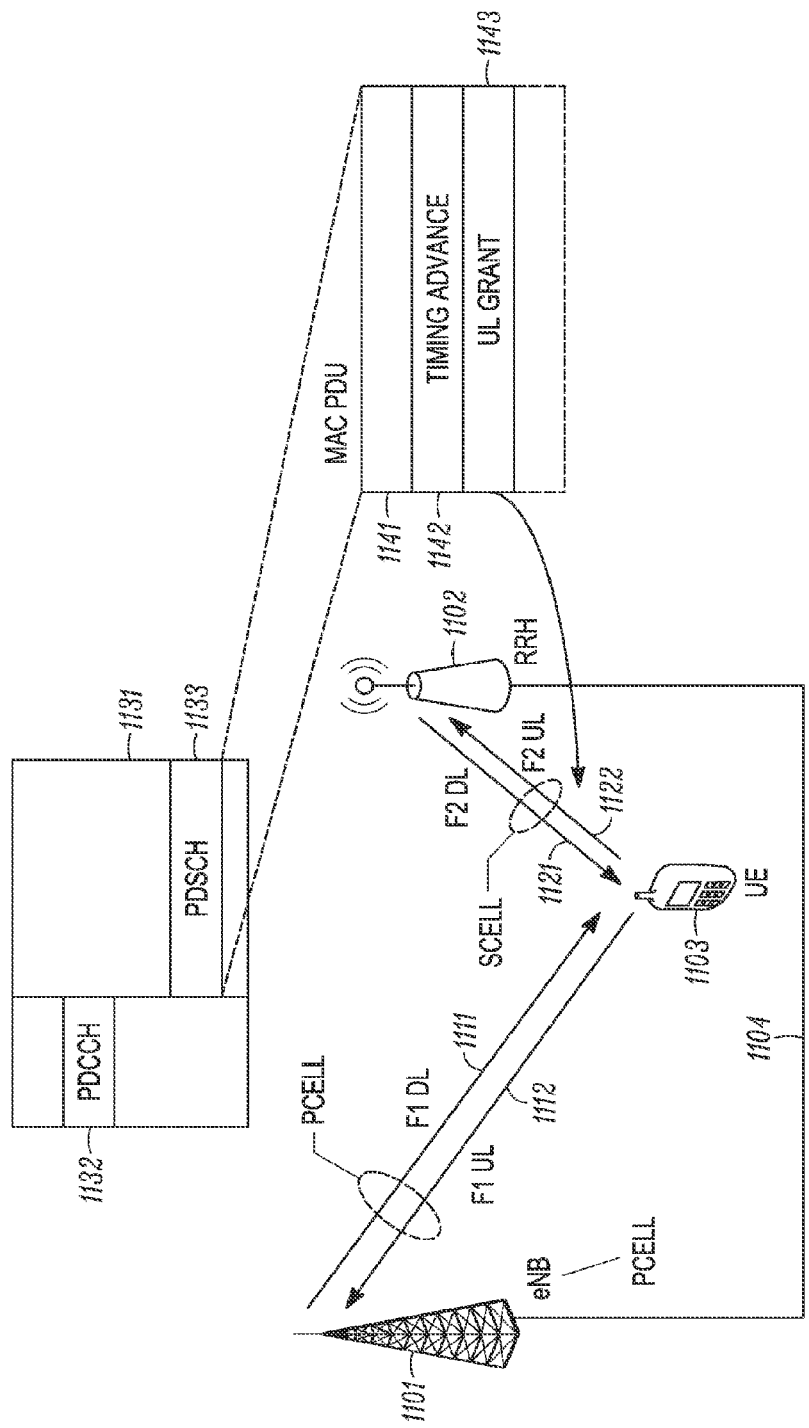
FIG. 11 illustrates an embodiment of the invention

According to another embodiment, illustrated in FIG. 11, the UE 1103 may be configured to operate on a PCell and an SCell. The PCell has a downlink frequency F1 DL (1111) and an uplink frequency F1 UL (1112). The SCell has a downlink frequency F2 DL (1121) and an uplink frequency F2 UL (1122). The PCell downlink transmission and uplink reception may be performed by an eNB (1101). The SCell downlink transmission and uplink reception may be performed by an RRH (1102) associated with the eNB (1101). The RRH (1102) may be connected to the eNB (1101) via a high-speed wired link (1104) that enables the eNB to perform scheduling of transmissions on the SCell. Thus, the RRH (1102) can function as a remote antenna of the eNB (1101).

The UE detects a transmission (1131) on F1 DL. The detected transmission (1131) includes a control channel component addressed to a unique identifier of the UE. The UE decodes the control channel (1132) and determines that the control channel indicates resources for a data channel (1133) in the transmission 1131. The UE decodes the data channel (1133) and obtains a message (1141). The message 1141 includes an uplink resource grant 1143. The message 1141 may also include timing advance information 1142. The UE transmits a message on the F2 UL using the uplink resource indicated in the uplink resource grant 1143.

Figure 12:
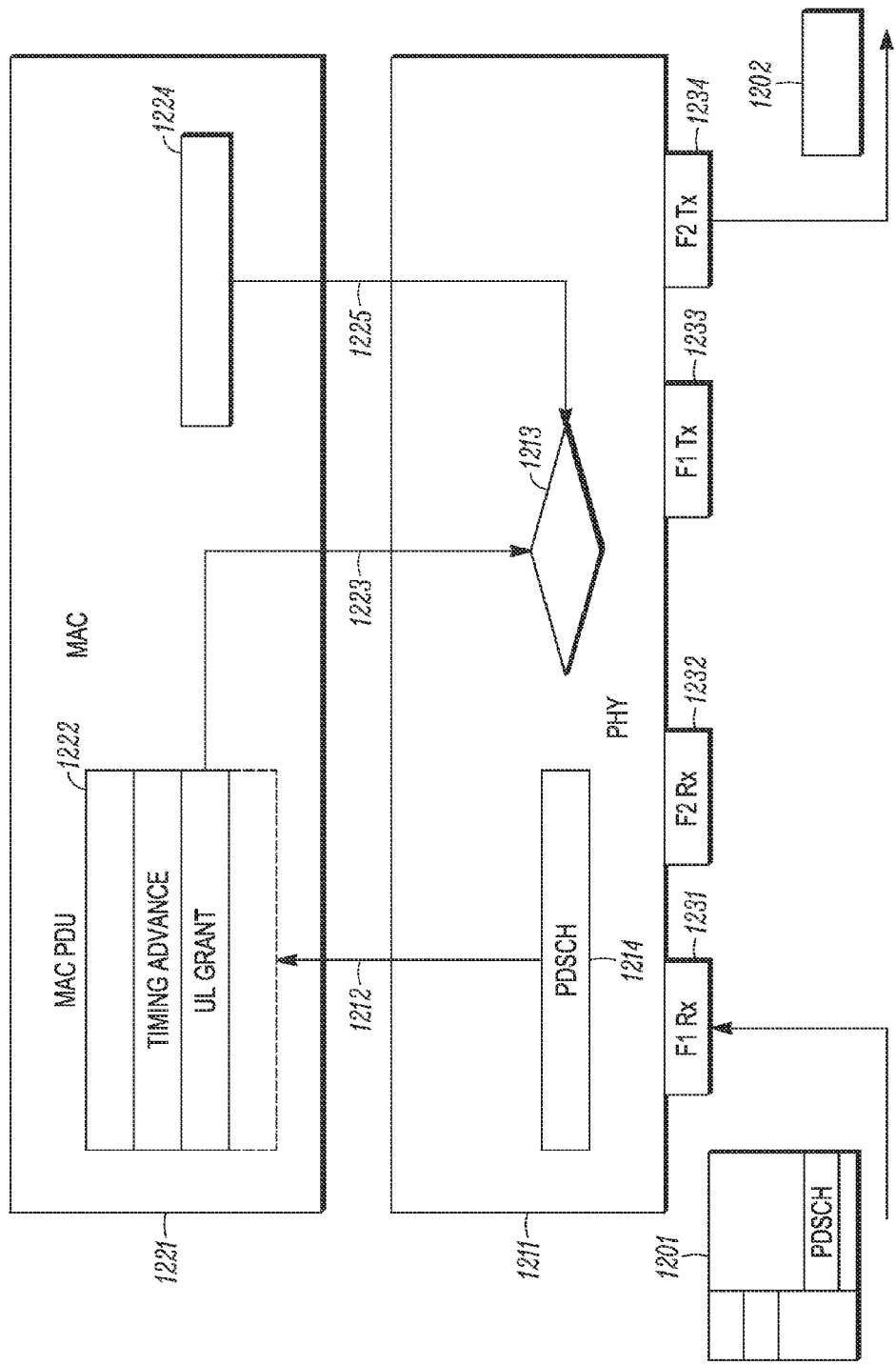
FIG. 12 illustrates operation within a mobile station according to an embodiment of the invention.

According to an embodiment, illustrated in FIG. 12, a UE implementation may include a physical layer 1211 and a medium access control (MAC) layer 1221. The physical layer can be configured to receive signals on at least a downlink frequency F1 (1231) and a downlink frequency F2 (1232). The physical layer can also be configured to transmit signals on at least an uplink frequency F1 (1233) and an uplink frequency F2 (1234). Further, the UE can be configured to apply different timing advance values to transmissions on uplink frequency F1 and uplink frequency F2. The physical layer can also include logic 1213 to receive transport blocks from the MAC layer 1221. The logic 1213 also determines whether a transport block is to be transmitted on the F1 uplink frequency or the F2 uplink frequency.

The UE may receive a transmission 1201 on the F1 downlink frequency. The transmission 1201 may comprise a control channel and a data channel. The physical layer 1211 decodes the control channel and obtains the data channel 1214. The physical layer transfers the received transport block in the data channel to the MAC layer 1212. The MAC layer retrieves a message 1222 from the transport block. The MAC layer decodes an uplink resource grant field in the message 1222. The MAC layer constructs a message 1224 for transmission by the UE. The MAC layer provides the a transport block including the message 1224 to the physical layer (1225). The MAC layer also provides to the physical layer the uplink resource grant information derived from the uplink resource grant field in the message 1222. Further, the MAC layer indicates to the logic 1213 in the physical layer that the message 1224 is to be transmitted on the uplink frequency F2 using the uplink resource grant information derived from the uplink resource grant field in the message 1222. The physical layer performs a transmission of the transport block received from the MAC layer on the uplink frequency F2 using the resources according to the uplink resource grant information.

According to an embodiment, a mobile station is configured for operation on at least a first cell and a second cell, the first cell having a first downlink frequency and a first uplink frequency, and the second cell having a second downlink frequency and a second uplink frequency. The mobile station receives a control channel transmission addressed to a unique identifier of the mobile station. The mobile station determines that the control channel transmission indicates resources for a data channel. The mobile station then receives a data channel transmission, the data channel transmission comprising a first message, the first message indicating a first resource for an uplink transmission. The mobile station then transmits, on the second uplink frequency, a second message using the first resource. The mobile station may receive the control channel transmission addressed to the unique identifier of the mobile station in response to a random access channel transmission. The first message may further include timing advance information. The mobile station may apply a timing advance derived from the timing advance information, to the second uplink frequency. The mobile station may fail to receive the second message. In response to determining that the second message is not received, the mobile station may disable the timing advance applied to transmission on the second uplink frequency.

According to another embodiment a mobile station implements a medium access control (MAC) protocol layer and physical layer. The mobile station receives, at the physical layer, a first message addressed to a unique identifier of the mobile station, the first message comprising a MAC protocol layer packet. The mobile station decodes from the MAC protocol layer packet an uplink resource allocation. The MAC layer constructs a second message for transmission by the physical layer. The MAC layer submits the second message to the physical layer, indicating the frequency on which the second message is to be transmitted.

While the invention has been particularly shown and described with reference to particular embodiments, it will be understood by those skilled in the art that various changes in form and details may be made therein without departing from the spirit and scope of the invention. It is intended that such changes come within the scope of the following claims:

The invention claimed is:

1. A method in a mobile station for performing random access, comprising:
  receiving, from a first cell, a message identifying a random access preamble to transmit to a second cell, wherein the first and second cell operate on different frequencies;
  determining, by the mobile station, whether the random access preamble is from a set of contention based random access preambles;
  receiving, by the mobile station, a random access response message, wherein the random access response message is addressed to a unique identifier of the mobile station; and
  transmitting, by the mobile station, if the identified random access preamble is from the set of contention based preambles, a timing verification message.

2. The method according to claim 1 wherein the timing verification message is transmitted to the second cell.

3. The method according to claim 1 wherein determining whether the random access preamble is from a set of contention based preambles comprises
  receiving system information of the second cell; and
  determining whether the random access preamble is from the set of contention based preambles of the second cell.

4. The method according to claim 1 wherein transmitting a timing verification message further comprises:
  receiving, in the random access response message, timing advance information;
  configuring a timing advance for the uplink frequency of the second cell, wherein the timing advance is derived from the timing advance information; and
  transmitting the timing verification message on the uplink frequency of the second cell.

5. The method according to claim 4 further comprising:
  receiving, subsequent to transmission of the timing verification message, a timing confirmation message; and
  applying the timing advance to all transmissions on the uplink frequency of the second cell.

6. The method according to claim 4 further comprising:
  failing to receive, subsequent to transmission of the timing verification message, a timing confirmation message; and
  disabling the timing advance for all transmissions on the uplink frequency of the second cell.

7. The method according to claim 6 wherein failing to receive a timing confirmation message includes failing to receive a timing confirmation message for a specified duration.

8. A method in a base station for performing random access by a mobile station, comprising:
  configuring the mobile station for operation on at least a first cell and a second cell;
  transmitting, on the first cell, a message assigning to the mobile station a random access preamble for performing random access on the second cell, wherein the random access preamble is a contention based random access preamble of the second cell;
  detecting a transmission of the random access preamble on the second cell; and
  transmitting a message addressed to a unique identifier of the mobile station, indicating a timing advance and an uplink resource grant, wherein the timing advance is determined based on the detected transmission of the random access preamble.

9. The method according to claim 8 wherein the uplink resource grant grants resources for uplink transmission on the second cell.

10. The method according to claim 8 further comprising:
  transmitting, on the second cell, a message addressed to a common identifier, indicating a timing advance and an uplink resource grant, wherein the uplink resource grant grants resources for uplink transmission on the second cell.

11. The method according to claim 8 further comprising:
  detecting a transmission by the mobile station in the uplink resources indicated in the uplink resource grant;
  determining whether the timing advance used for the transmission by the mobile station is correct; and transmitting, if the timing advance used for the transmission by the mobile station is correct, a message indicating a confirmation of timing.

12. The method according to claim 11 further comprising:
transmitting, if the timing advance used for the transmission by the mobile station is incorrect, a message indicating a timing failure.

13. The method according to claim 11 wherein determining whether the timing advance used for the transmission by the mobile station is correct includes determining that the transmission does not cause significant interference to other uplink transmissions.

14. The method according to claim 11 wherein determining whether the timing advance used for the transmission by the mobile station is correct includes:
determining a first time at which the transmission by the mobile station in the uplink resources indicated in the uplink resource grant is expected; and
determining whether the time at which the transmission by the mobile station in the uplink resources indicated in the uplink resource grant is received is substantially same as the first time.

* * * * *